United States Patent [19]

Apfelbeck et al.

[11] 4,357,524
[45] Nov. 2, 1982

[54] ELECTRICAL HEATER CONTROLLER FOR AIRCRAFT WINDOW HEAT CONTROL

[75] Inventors: Otto L. Apfelbeck, Fort Shawnee; Joseph M. Urish, Shawnee, both of Ohio

[73] Assignee: Westinghouse Electric Corp., Pittsburgh, Pa.

[21] Appl. No.: 116,515

[22] Filed: Jan. 29, 1980

[51] Int. Cl.³ .............................................. H05B 1/02
[52] U.S. Cl. ................................... 219/501; 219/203; 219/490; 219/497; 307/265; 307/271; 323/299; 244/134 D
[58] Field of Search .............. 219/490, 494, 497, 499, 219/501, 505, 508, 509, 510, 201, 202, 203, 492, 235; 323/235, 299; 307/117, 208, 220 R, 240, 269, 271, 265; 244/58, 134 D, 129.3; 332/9 T

[56] References Cited

U.S. PATENT DOCUMENTS

| | | | |
|---|---|---|---|
| 3,519,917 | 7/1970 | Martin | 219/497 X |
| 3,821,516 | 6/1974 | Hayes et al. | 219/497 |
| 3,946,200 | 3/1976 | Juodikis | 219/501 |
| 4,216,371 | 8/1980 | Marotel | 219/501 |
| 4,272,671 | 6/1981 | Hukagawa et al. | 219/505 |

OTHER PUBLICATIONS

Technical Report AFFDL-TR-77-1, vol. 1, 9-1977, "Windshield Technology Demonstrate Program", pp. 157-166.

Primary Examiner—M. H. Paschall
Attorney, Agent, or Firm—R. P. Lenart

[57] ABSTRACT

A controller system using high frequency switching by providing a bilateral switch gated on and off at a frequency about ten times the source frequency and the duty cycle determined by pulse width modulation of the high frequency waveform in accordance with window heater temperature.

5 Claims, 4 Drawing Figures

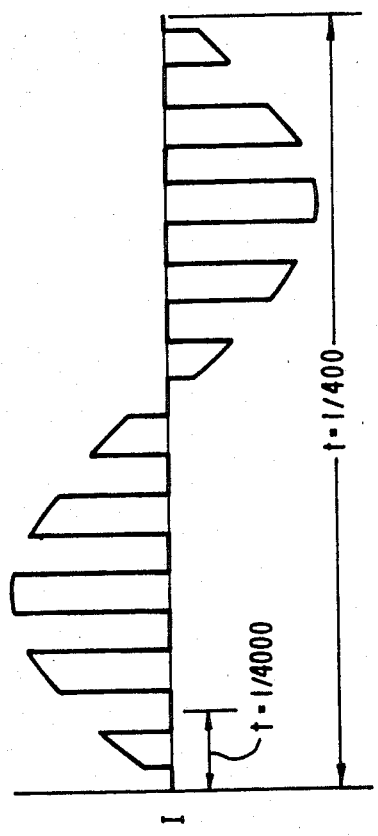
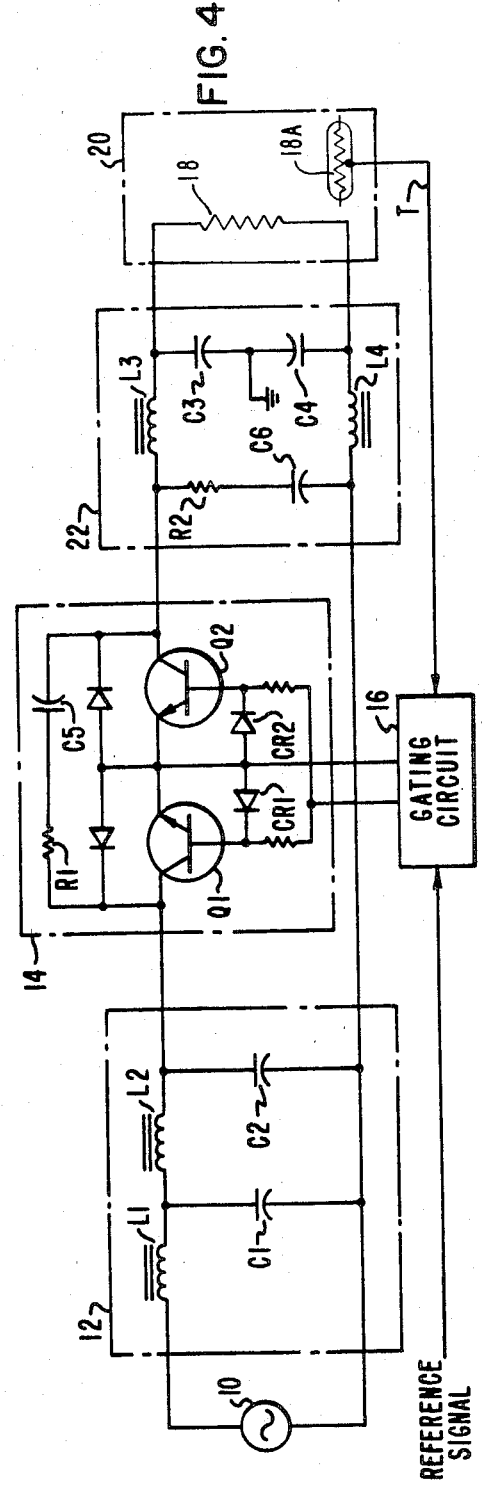

ELECTRICAL HEATER CONTROLLER FOR AIRCRAFT WINDOW HEAT CONTROL

BACKGROUND OF THE INVENTION

This invention relates to electrical resistance heater controllers and particularly to such controllers for heaters embedded in aircraft windshields that are to be fog and ice free.

Aircraft windows are normally a laminated assembly of glass or plastic of which one of the lamina is electrically conductive and serves as an electric heating element to avoid condensation and ice buildup. The window heating element is supplied AC current, typically at 400 Hz from the usual aircraft generators. A window heat controller is used with the heating element to hold the windshield temperature within an appropriate selected range. Window heat controllers are intended to provide efficient use of electrical energy, low cost and weight, good operational reliability, and easy maintenance.

Various known window heat controllers include the following:

On-off control—This form of controller applies full current to the window until its temperature reaches a predetermined value at which time the current is reduced to zero and is reapplied at full value when the temperature drops to a lower predetermined value. In performance, such control is adequate for relatively small heating loads, such as about 200 to 1000 watts, but results in unacceptable power supply line disturbances for larger heating loads ranging up to 3000 or 4000 watts.

Tap changer control—In this form of control a key element is a transformer with several taps so that the value of current applied to the window can be varied by selection of one of the different taps. Thus, when the window temperature reaches an upper predetermined value, the next lower tap is selected and the tap changing process continues to apply more or less current to the window to maintain its temperature within a narrow range. This form of control is susceptible to an undesirable failure mode when implemented with solid state switches. If one tap switch fails shorted, a tap-to-tap short occurs when the adjacent tap switch is closed. This is a possible source of overload on the transformer that could lead to overheating and fire.

Phase angle control—In this type of control scheme, the conduction period of each half cycle of current is varied to meet window heat requirements. Thus, for maximum heat, heating current would flow for the full 180° of each half cycle. For application of half power, no current would flow from, say, 0° to 90°, then current would rise to its peak value and decrease to 0° at 180° to obtain the necessary heating. This has the disadvantage of requiring heavy filtering to buffer the supply line from the step changes in current when other than zero or 180° conduction occur. Various schemes employing magnetic amplifiers whose output power level is proportional to sensor demand are known which operate in principle similarly to that of the phase angle control apparatus.

Pulse modulated controller—The pulse modulated controller is an energy proportional design that requires one pair of solid state switches per phase to conduct current to the load. As used it is intended to switch the entire AC cycle current to the load with the number of controller output cycles made proportional to the temperature sensor demand. Such apparatus may cause amplitude modulation to the power source or phase voltage unbalance in single phase or two phase designs.

SUMMARY OF THE INVENTION

The present invention provides an alternative to the foregoing controller arrangements by employing high frequency switching to accomplish control of power to the window heater. This use of high frequency switching results in apparatus that is lighter in weight than conventional circuits because the filter inductance and capacitance are lower.

The invention generally comprises a bilateral solid state switch that is controlled by circuitry that turns it on and off periodically at a frequency about an order of magnitude higher than the source power frequency so that the source frequency waveform is divided into much smaller segments within which the on to off ratio of conduction of the switch is dependent upon a heating element temperature signal. An input filter on the source side of the switch provides a low impedance path for harmonics generated by the switch and an output filter on the window side of the switch attenuates harmonics generated by the heating element in the window.

BRIEF DESCRIPTION OF THE DRAWINGS

FIG. 3 is a waveform of the output current at a 50% duty cycle in accordance with the present invention; and FIG. 4 is a circuit schematic of one embodiment of a window heat controller in accordance with this invention.

DESCRIPTION OF PREFERRED EMBODIMENTS

Figure 1:
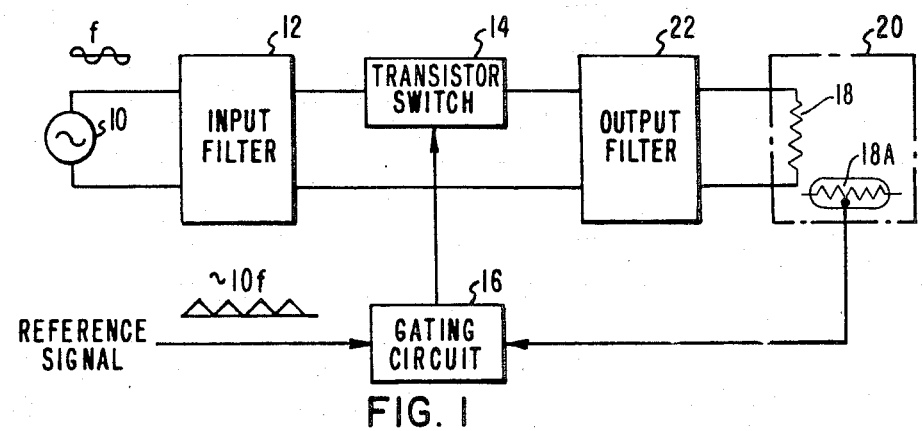
FIG. 1 is a schematic block diagram of a window heat controller system for aircraft window heat control in accordance with the present invention.

Referring to FIG. 1, there is shown a block diagram of the power section of a window heat control circuit. A generator 10 which may be any number of phases typically 3 or 6 phases supplies a single phase AC input, at a frequency f, such as 400 Hz, through an input filter section 12 to a transistor switch 14. The transistor switch is switched by a gating or drive circuit 16 that is responsive to a unidirectional time varying reference signal and also to a temperature proportional signal from the temperature sensing element 18a, which is embedded in the window 20 containing the heating element 18 to which controlled power is supplied. Also present is an output filter 22 between the transistor switch 14 and the window heating element 18. The reference signal is at a higher frequency such as at least approximately 10 times the line frequency and is synchronized with the line to maintain consistency throughout the operating range.

Figure 2:
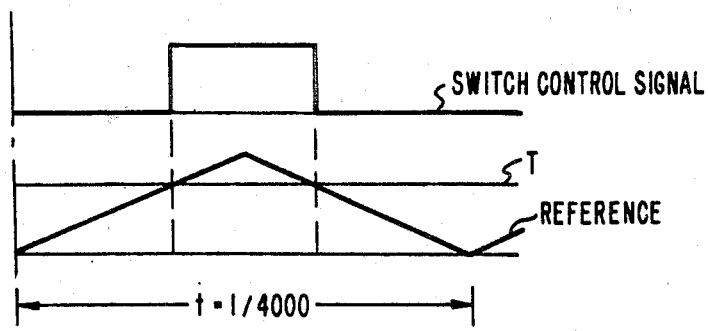
FIG. 2 is a plot of control signal waveform and window temperature to show their interrelation in the control scheme of the invention.

The control of the power applied to the heating element 18 is achieved by pulse width variation, in response to window temperature changes, of the high frequency switched waveform. As shown in FIG. 2, also with reference to FIG. 3, during a period of the high frequency wave, the reference waveform appears as shown. This reference is compared with a window temperature signal T from the temperature sensing element 18a in the window 20 and during that part of the waveform in which the reference exceeds the window temperature a switch control signal is applied by the gating circuit 16 to the transistor switch 14 and the transistor switch conducts during that portion of the cycle.

The temperature sensing element 18a may be a thermally responsive resistance embedded in the window thermally proximate the heating element 18. Such a sensing element 18a is connected in a circuit (not shown) supplying it with a voltage that will develop a current that is variable with temperature, in accordance with former window heat controller practice.

In FIG. 3 it is seen how the waveform of output current to the window heater 18 appears in an instance in which the transistor switch 14 is conducting on a 50% duty cycle. That is, during each high frequency cycle, of 1/4000 second for example, the switching controller turns on the transistor switch 14 to provide conduction during just one-half of that period and repeatedly does this throughout the full cycle of 1/400 seconds of the power source waveform, at 400 Hz.

Referring to FIG. 4, the window heat controller is shown in one embodiment. In transistor switch 14, transistors Q1 and Q2 are connected with their emitters together and their collectors serially related to the source and output terminals. Associated with the base circuits of transistors Q1 and Q2 are diodes CR1 and CR2 to which the switch control signals from the gating circuit 16 are applied. This provides a bilateral switch providing conduction of both transistors Q1 and Q2 independent of the polarity of the applied source waveform. The transistor switch configuration shown is one of several generally suitable as bilateral switches in accordance with power switching practice. Terminals within the bilateral switch are associated with the gating circuit which provides the time varying reference for high frequency switching and compares it with the temperature signal T from the window heater and provides a switching signal in accordance with FIG. 2.

Of significance to the heat controller of FIG. 4 is the input filter 12 which provides a low impedance path for the harmonics generated by the switching controller 14. It comprises inductors L1 and L2 and capacitors C1 and C2 arranged in a double L section low pass filter with a cut-off of approximately 1600 Hz, which is well between the frequencies of the power source and the switching controller. Its estimated weight is approximately 3.5 pounds compared to approximately 7 pounds for the equivalent filter for a phase angle control unit. A small low pass output filter comprising elements L3, L4 and associated capacitors C3 and C4 is also added to attenuate unwanted radiation from the output conductors and window heater element 18.

In the input filter, inductors L1 and L2 may be identical, as well as are the capacitors C1 and C2. The attenuation factor for the filter as a function of frequency is given by $$I_{line} = I_{ripple} \times \frac{1}{1 - 3\left(\frac{\omega}{\omega_0}\right)^2 + \left(\frac{\omega}{\omega_0}\right)^4},$$

where $\omega = \frac{1}{\sqrt{L_1 C_1}}$.

In a working embodiment, L1 and L2 were selected as 0.8 millihenrys and C1 and C2 were selected as 12 microfarads. The AC power switch consisted of two transistors and two diodes connected as shown in which the transistors were selected as Motorola Type MJ10015.

The harmonic currents present in the waveform of FIG. 3 are given by $$H = N(f_2 \pm f_1),$$

where
N = 1, 2, 3, 4, etc.
$f_1$ = source voltage frequency
$f_2$ = switching frequency In the output filter 22 the inductors chosen for L3 and L4 were of 2.5 microhenrys and the two feedthrough capacitors C3 and C4 were of 0.5 microfarad. In operation of the breadboard at 115 volts AC, 400 Hz and a fixed duty cycle of approximately 50%, in which the output load simulating the window heater was a resistive load bank of approximately 5.8 ohms resulting in 29 ampere peak currents, the effective performance of the invention was confirmed. The resistive load bank simulating the window provided approximately the current peaks that would be obtained with 180 volts AC and a 3500 watt window.

Input and output currents were analyzed and confirmed the intended performance including that the input filter effectively attenuates the generated harmonics. Analysis of output currents also indicates an acceptable low level of harmonics so that it is shown that the high frequency switching window heat controller of the invention can meet the necessary performance characteristics of aircraft window heat controllers while being amenable to reduction in filter weight by about 50% over some prior techniques such as phase angle control.

While the present invention has been shown and described in few forms only it will be understood that it may take various forms in accordance with the skill of the art within its general teachings.

We claim:
1. An electrical resistance heater controller, for controlling application of power from an AC source to a heating element, comprising:
   bilateral switching means for maintaining or interrupting the circuit between the source and the heating element;
   gating means for turning said switching means on and off periodically at a frequency at least about an order of magnitude higher than the source power frequency, said gating means being receptive of and responsive to a temperature signal from a sensor proximate said heating element, and said gating means controlling the on to off ratio of conduction of said switching means within each high frequency segment; and
   input filter means connected on the source side of said switching means for providing a low impedance path for harmonics generated by said switching means.

2. An electrical resistance heater controller in accordance with claim 1 wherein:
   said bilateral switching means comprises a pair of transistors whose emitters and collectors are connected in a series circuit path between input and output terminals for connection respectively with the power source and the resistance heater, and whose bases are connected respectively through each of a pair of diodes to said gating means; and, said gating means drives said switching means on during a portion of each high frequency cycle during which the heating element temperature signal is below a reference signal that varies between minima that occur at the high frequency.

3. An electrical resistance heater controller in accordance with either of claims 1 or 2 further comprising:

output filter means connected on the heating element side of said switching means for attenuating harmonics generated by the heating element.

4. A window heat controller system particularly for aircraft window heat control comprising:

an AC generator producing power at a first frequency;

an electrical resistance heating element connected to receive controlled power from said generator and associated with temperature sensing means for developing a DC signal proportional to the temperature of said heating element;

controller means for switching the generator power at a high frequency of at least about ten times said first frequency and for maintaining the conduction path between said generator and said heating element on during a portion of each high frequency cycle when said temperature signal is below a reference signal level that varies unidirectionally between minima at said high frequency;

input filter means connected between said generator and said controller means for providing a low impedance path for harmonics generated by said switching means; and, output filter means for attenuating harmonics generated by said heating element and its associated conductors.

5. A window heat controller system in accordance with claim 4 wherein:

said first frequency is approximately 400 Hz, said high frequency is at least approximately 4000 Hz, and said input filter means has a cut-off frequency of approximately 1600 Hz.

* * * * *